(12) United States Patent
Johnsen et al.

(10) Patent No.: US 7,669,087 B1
(45) Date of Patent: Feb. 23, 2010

(54) METHOD AND APPARATUS FOR MANAGING WORKLOAD ACROSS MULTIPLE RESOURCES

(75) Inventors: Bjørn Dag Johnsen, Oslo (NO); Daniel Delfatti, Belmont, CA (US); Hans Ludvig Opheim, Slattum (NO)

(73) Assignee: Sun Microsystems, Inc., Santa Clara, CA (US)

( * ) Notice: Subject to any disclaimer, the term of this patent is extended or adjusted under 35 U.S.C. 154(b) by 534 days.

(21) Appl. No.: 11/497,022

(22) Filed: Jul. 31, 2006

(51) Int. Cl.
*G06F 11/00* (2006.01)

(52) U.S. Cl. ............................... 714/47; 714/7; 714/13

(58) Field of Classification Search .................... 714/7, 714/13, 47; 709/224
See application file for complete search history.

(56) References Cited

U.S. PATENT DOCUMENTS

| | | | | |
|---|---|---|---|---|
| 6,219,805 B1 * | 4/2001 | Jones et al. | | 714/38 |
| 6,237,063 B1 * | 5/2001 | Bachmat et al. | | 711/114 |
| 6,249,887 B1 * | 6/2001 | Gray et al. | | 714/47 |
| 6,560,717 B1 * | 5/2003 | Scott et al. | | 714/4 |
| 6,629,266 B1 * | 9/2003 | Harper et al. | | 714/38 |
| 6,704,812 B2 * | 3/2004 | Bakke et al. | | 710/38 |
| 6,766,416 B2 * | 7/2004 | Bachmat | | 711/114 |
| 6,820,215 B2 * | 11/2004 | Harper et al. | | 714/15 |
| 6,871,299 B2 * | 3/2005 | Havekost et al. | | 714/47 |
| 6,895,533 B2 * | 5/2005 | Gray et al. | | 714/47 |
| 6,912,676 B1 * | 6/2005 | Gusler et al. | | 714/47 |
| 6,948,102 B2 * | 9/2005 | Smith | | 714/47 |
| 7,028,216 B2 * | 4/2006 | Aizawa et al. | | 714/7 |
| 7,039,777 B2 * | 5/2006 | Yamagami et al. | | 711/162 |
| 7,065,641 B2 * | 6/2006 | Schelling | | 713/2 |
| 7,225,356 B2 * | 5/2007 | Monitzer | | 714/12 |
| 7,305,579 B2 * | 12/2007 | Williams | | 714/7 |
| 7,313,735 B1 * | 12/2007 | Levergood et al. | | 714/47 |
| 7,343,459 B2 * | 3/2008 | Prahlad et al. | | 711/162 |
| 7,346,811 B1 * | 3/2008 | Gao et al. | | 714/47 |
| 7,370,241 B2 * | 5/2008 | Nicholson et al. | | 714/47 |
| 7,409,594 B2 * | 8/2008 | Mukherjee et al. | | 714/26 |
| 7,424,604 B2 * | 9/2008 | Schelling | | 713/2 |
| 7,426,657 B2 * | 9/2008 | Zorek et al. | | 714/13 |
| 7,451,340 B2 * | 11/2008 | Doshi et al. | | 714/4 |
| 7,457,916 B2 * | 11/2008 | Suzuki et al. | | 711/114 |
| 7,467,329 B1 * | 12/2008 | Keeton et al. | | 714/15 |
| 7,480,715 B1 * | 1/2009 | Barker et al. | | 709/224 |
| 7,483,815 B2 * | 1/2009 | Palma et al. | | 702/182 |
| 7,484,132 B2 * | 1/2009 | Garbow | | 714/47 |
| 7,509,537 B1 * | 3/2009 | Jensen et al. | | 714/47 |
| 2003/0115511 A1 * | 6/2003 | Kubota | | 714/47 |
| 2003/0182599 A1 * | 9/2003 | Gray et al. | | 714/41 |
| 2003/0204788 A1 * | 10/2003 | Smith | | 714/47 |
| 2003/0204789 A1 * | 10/2003 | Peebles et al. | | 714/47 |
| 2004/0153866 A1 * | 8/2004 | Guimbellot et al. | | 714/47 |

(Continued)

*Primary Examiner*—Robert Beausoliel
*Assistant Examiner*—Joshua P Lottich
(74) *Attorney, Agent, or Firm*—Park, Vaughan & Fleming LLP

(57) ABSTRACT

A method for operating a system comprising multiple resources. The method comprises identifying for each resource a set of one or more failure risks for that resource. For each identified failure risk, a likelihood of failure is combined with an expected resolution time to provide a risk weight for the identified failure risk. For each resource, the risk weights for each failure risk are accumulated to provide an accumulated risk weight for the resource. A resource manager provisions workload across the multiple resources based on the accumulated risk weights for each resource.

20 Claims, 2 Drawing Sheets

U.S. PATENT DOCUMENTS

| | | | |
|---|---|---|---|
| 2004/0254764 A1* | 12/2004 | Wetzer et al. | 702/184 |
| 2005/0065961 A1* | 3/2005 | Aguren | 707/102 |
| 2005/0182834 A1* | 8/2005 | Black | 709/224 |
| 2006/0036908 A1* | 2/2006 | Helliker et al. | 714/13 |
| 2006/0095247 A1* | 5/2006 | O'Connell et al. | 703/22 |
| 2007/0214394 A1* | 9/2007 | Gross et al. | 714/47 |
| 2007/0233865 A1* | 10/2007 | Garbow et al. | 709/226 |
| 2007/0274304 A1* | 11/2007 | Lycette | 370/370 |
| 2008/0168314 A1* | 7/2008 | Narayan et al. | 714/47 |

\* cited by examiner

METHOD AND APPARATUS FOR MANAGING WORKLOAD ACROSS MULTIPLE RESOURCES

FIELD OF THE INVENTION

The present invention relates to computer systems comprising multiple resources, and in particular to the management of workload across such resources.

BACKGROUND OF THE INVENTION

A computer system provides a collection of hardware resources such as processors, storage units, network interfaces, etc for the performance of computational tasks. These resources may be provided by a single machine or may be distributed across multiple machines. Many computer systems include multiple instances of a given resource. For example, a system may incorporate multiple processing nodes to provide redundancy in case one of the processing nodes fails, in that the other processing nodes remain available to carry out computational tasks. Incorporating redundancy into a system however adds to the expense of the system. Consequently, it is undesirable to replicate a component within a system if such replication has only a slight or no impact on the reliability and availability of the resulting system.

An assessment of availability is usually based on a statistic such as the mean time between failure (MTBF) or the average (or annualised) failure rate (AFR). The AFR inherently expresses a probability of failure within a specific time window, normalized to one year, and hence may be considered as a more directly useful measure of failure rate than MTBF. The AFR associated with a hardware product such as a server, compute blade, switch, IO adapter, etc, is an indication of the expected availability of the product. The AFR for various products can therefore be used in making decisions about how much redundancy to include within an overall system, based on the desired level of availability for the system.

In some computer systems, the provisioning or allocation of computational tasks to the available resources in the system is controlled by a resource manager. For example, if an application requires a particular amount of processing power and a particular amount of storage, the resource manager can allocate hardware resources to the application to provide the desired capabilities.

In many installations, the hardware resources belong to or are managed by a service provider, who runs (hosts) applications on behalf of one or more third parties (i.e. customers). The service provider has to match the available resources against the needs of the various applications. In some cases the resources allocated to a particular customer may be fixed, in which case the resource manager just has to balance the allocated resources against the applications for that one customer. In other cases, the resource manager may have to balance the available resources across multiple customers.

Projected availability in terms of AFR may be used as one of the provisioning parameters when deploying services on a clustered or distributed system. For example, the billing to a customer may be based on a certain level of service availability being provided over a lease period. It is therefore important for the service provider to be able to project the availability of the system.

Service provisioning for the resource manager is complicated by the fact that the available resources may vary with time. For example, there may be a change in configuration, or a particular hardware resource may fail due to some internal problem. In this latter case, the machine may need a service operation in order to repair, replace or upgrade the resource (hardware or software), and this may then render certain other hardware resources within the machine unavailable while the service operation is in progress. Similarly, an upgrade to the operating system of the machine may be followed by a system reboot, during which time the hardware resources of the system may be unavailable. One or more hardware resources might also be taken off-line to facilitate testing or servicing of the electrical power circuits, air conditioning facilities and so on for a machine. The resource manager therefore has the difficult task of matching the available resources against the requirements of various applications on a dynamic basis to address factors such as availability and capacity.

SUMMARY OF THE INVENTION

Accordingly, one embodiment of the invention provides a method for operating a system comprising multiple resources. The method comprises identifying for each resource a set of one or more failure risks for that resource. For each identified failure risk a likelihood of failure is combined with an expected resolution time to provide a risk weight for the identified failure risk. For each resource, the risk weights for each failure risk are accumulated to provide an accumulated risk weight for the resource. Workload for the system is provisioned across the multiple resources based on the accumulated risk weight for each resource.

In general, workload tasks that are regarded as more important (higher priority) may be allocated to resources having a lower accumulated risk weight. A low accumulated risk weight may reflect a low likelihood of failure and/or a low expected resolution time. In other words, the provisioning of an important task may tolerate a relatively high likelihood of failure if such failure can be rectified quickly without undue delay to completion of the task. Thus the inclusion of expected resolution time to determine the accumulated risk weight allows a resource manager to make more sophisticated provisioning arrangements.

In one embodiment, the likelihood of failure used to determine the risk weights is based on an annualised failure rate (AFR) value. AFR values are frequently available from design and test work on various system components. In some embodiments, the AFR value may supplemented by a predictive or diagnosis analysis based on observed errors in the system in order to determine the likelihood of failure. For example, if a particular component is experiencing an increased error rate, this may indicate that the component is more likely to fail soon (compared to the standard AFR value). The predictive or diagnosis analysis may also be based on an observed pattern of symptoms (rather than errors per se). For example, the system may be experiencing a constant shortage of free memory or other critical system resources, or an increase in the rate of deadlocks. Another possibility is that the operating temperature of a particular component may be seen to rise steadily. Symptoms such as these may again be indicative that the relevant component (hardware or software) is likely to fail soon.

The expected resolution time represents the time to perform a repair, replacement or other remedial action for a resource. This time may vary significantly. For example, if the system already includes a cold spare for a component, then the expected resolution time should the component fail may be no more than the system re-boot time to bring the spare on-line. The expected resolution time may also be the system re-boot time if the problem is primarily software. Alternatively, the expected resolution time may represent the time to obtain and replace a field replaceable unit (FRU). If the FRU is available on-site then the time to obtain may be negligible, with the main component of the expected resolution time being the duration of the service operation itself to replace the FRU. On the other hand, if the FRU is held at some depot or warehouse, the delivery time from the depot may dominate the expected resolution time.

In one embodiment, the method further comprises updating the accumulated risk weight in response to a change in the expected resolution time for at least one risk failure. For example, if a cold spare is utilised to replace a failed component, any subsequent repairs may have to be serviced by a obtaining a component from a warehouse, thereby leading to a much longer expected resolution time.

In one embodiment, a box manager is provided in association with one or more resources. The box manager is responsible for identifying the failure risks, for combining the likelihood of failure and the expected resolution time to produce the risk weights, and for accumulating the risk weights for the one or more resources. The box manager forwards the accumulated risk weights to a resource manager responsible for the workload provisioning.

In one embodiment, the multiple resources are grouped into fault zones such that all resources in a fault zone may be subject to a single point of failure. The method further comprises determining an accumulated risk weight for each fault zone.

Another embodiment of the invention provides apparatus having multiple resources. The apparatus comprises a set of one or more identified failure risks for each resource, wherein each identified failure risk has an associated likelihood of failure and an expected resolution time. The apparatus further comprises logic configured to accumulate for each resource a set of risk weights to provide an accumulated risk weight for the resource. The set of risk weights is determined based on the likelihood of failure and the expected resolution time for each identified failure risk. The apparatus further comprises a resource manager for provisioning workload across the multiple resources based on the accumulated risk weight for each resource.

Other embodiments of the invention provide a computer program and computer program product for implementing the various methods described above.

BRIEF DESCRIPTION OF THE DRAWINGS

Various embodiments of the invention will now be described in detail by way of example only with reference to the following drawings, in which like reference numerals pertain to like elements, and in which.

DETAILED DESCRIPTION

Figure 1:
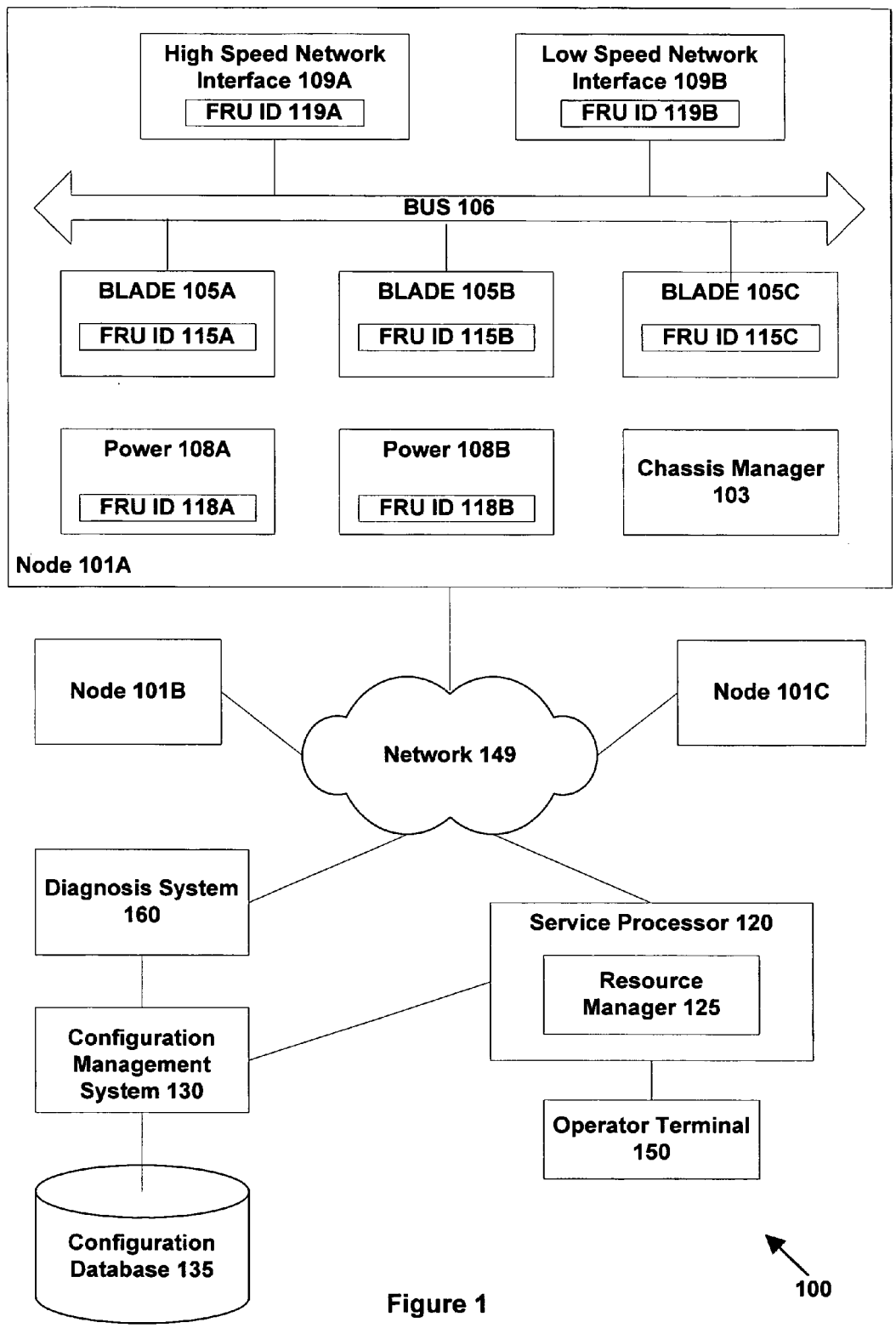
FIG. 1 provides a high-level schematic depiction of a computer system in accordance with one embodiment of the invention.

FIG. 1 is a schematic illustration of a computer system 100 in accordance with one embodiment of the invention. Computer system 100 comprises multiple nodes 101A, 101B, and 101C linked by computer network 149. Computer system 100 may represent a variety of possible architectures. For example, in one embodiment, nodes 101 may represent individual subsystems within a single distributed computer system. In another embodiment, nodes 101 may represent individual servers in a cluster of servers managed as a single group. In another embodiment, nodes 101 may represent communications nodes (switches or end-points) within network 149, in which case system 100 may correspond to the overall network. It will be appreciated that other systems may have more or fewer nodes than system 100 as shown in FIG. 1; in addition, the topology of network connections between the nodes may vary as appropriate.

FIG. 1 illustrates components within one node 101A in more detail (for clarity the internal structure of the remaining computing nodes 101B, 101C is omitted). The components shown in FIG. 1 correspond to an example embodiment where node 101A represents a server, but will vary as appropriate for other embodiments and implementations. It will be appreciated that the remaining nodes 101B, 101C of system 100 may have a structure that is generally analogous to that of node 101A, but the precise number and configuration of components within a given node may vary from one node to another.

Node 101A is shown in FIG. 1 as comprising three compute blades 105A, 105B, 105C (although in practice the number of blades in a server is likely to be much higher). Each blade is linked via bus 106 to a high-speed network interface 109A and also to a low-speed network interface 109B. Node 101A also includes chassis management firmware (a chassis or box manager) 103, as described in more detail below.

Blades 105, power supplies 108 and network interfaces 109 represent field replaceable units (FRUs). An FRU represents a component that can be removed or replaced in its entirety by a service engineer in the field. Such a service operation might be triggered by the need to replace a faulty FRU, or to upgrade a system by inserting a new, more powerful FRU, or to remove a FRU, perhaps for use in another node.

Note that a FRU may incorporate one or more smaller FRUs. For example a server blade 105 might include a processor, memory, and possibly disk storage. Each of these components could then be provided as a separate FRU within the blade 105 in order to allow replacement or upgrade as necessary. For clarity, these additional possible levels for a hierarchy of FRUs are omitted from FIG. 1.

Each FRU in system 100 is provided with a memory, such as an electronically erasable programmable read only memory (EEPROM). This memory is used to store various information about the FRU, including identifying (ID) information such as device type and serial number. Thus as shown in FIG. 1, blades 105 include FRU ID information 115, power supplies 108 include FRU ID information 118, and network interfaces 109 include FRU ID information 119. Other details may be stored as appropriate in the FRU ID memory, such as manufacturer, manufacture date and so on.

Computer system 100 also includes a service processor 120 which is responsible for the general management of computer system 100. A resource manager 125 runs on the service processor 120. Linked to service processor 120 is operator terminal 150. If the service processor 120 becomes aware of a problem within computer system 100, this problem can be reported via operator terminal 150. Operator terminal 150 also allows a user to provide various commands and control information to computer system 100, such as configuration instructions and parameters. Note that if system 100 comprises a communication network, then a subnet manager may be provided instead of or on service processor 120 to control configuration and general operations involving the network and the nodes in the network.

The resource manager 125 views computer system 100 as a logical set of computational resources. For example, blades 105A, 105B, and 105C each provide some level of processing resource, while each of network interfaces 109A and 109B provides a communications resource. However, resource manager is not generally concerned at the level of physical components, and so would not maintain information about support components such as power supplies 108A, 108B. This allows the resource manager to be written in generic function, and so the resource manager does not need to be modified or updated for each new hardware release, etc.

Computer system 100 further includes a configuration database 135 which is used by system 100 to store data about the identity and interconnection of the various components within computer system 100. For example, the information in configuration database 135 may indicate that blades 105A, 105B and 105C are all present and connected to bus 106. The configuration database 135 may also store information to the effect that node 101A has two power supplies 108A, 108B, and that these are redundant, thereby allowing node 101A to continue operations even if one of these two power supplies were to fail.

The configuration database 135 is accessed via configuration management system 130. Thus user configuration commands entered into operator terminal 150 are passed by the service processor 120 to configuration management system 130 for implementation, and the results are saved into the configuration database 135. The configuration management system 130 may also be responsible for preventing the user from setting a configuration that might damage the system. For example, thermal considerations may limit the amount of processing power that can be connected to bus 106. The configuration management system 130 can then be used to ensure that the number and/or power of the blades 105 attached to bus 106 does not contravene this limit.

The configuration management system 130 may also be set up to perform automatic (re)configuration, potentially in accordance with a set of user priorities or preferences. As an example, blades 105 may initially be configured to use high-speed network interface 109A for communications. However, if the configuration manager 130 detects that this interface 109A has failed, then the configuration manager may reconfigure blades 105 to use the low speed network interface 109B instead. Providing redundant combinations of components, such as multiple blades 105 and multiple power supplies 108 within node 101A, implies that a single point of failure within one redundant component is not fatal for the corresponding subsystem.

In one embodiment, system 100 corresponds to nodes distributed across a communications network, the chassis management firmware 103 corresponds to a box manager (BM), and the service processor 120 corresponds to a network or fabric manager (FM). The box manager knows about the resources and support systems within a particular physical unit (e.g. a node or some other structure). In particular, the box manager knows the dependency relationships between the resource units and the support units, including any redundancy provided within the box. Note that although the box manager may be provided as chassis management firmware, it may also be implemented as a separate subsystem linked to the chassis or in any other appropriate manner. The box manager may interact with the configuration management system 130 and the configuration database 135 to obtain and/or to provide configuration information for a node.

U.S. patent application Ser. No. 11/061,236, filed 17 Feb. 2005, entitled "COMPUTER NETWORK", and assigned to the same assignee as the present application, discloses a provisioning system to determine dependencies among network resources. The provisioning system defines fault zones within a network to provide redundancy protection against single points of failure that could bring down a complete service or critical service component. Each fault zone is independent of other fault zones, in that a failure of a component within one fault zone should not impact the availability of services provided by another fault zone. In other words, no single point of failure impacts more than one fault zone. A subnet manager can therefore configure first and second routes from a given source to a given destination to pass through two different sets of fault zones. This then ensures that there is redundancy in terms of communications between the source and destination, in that even if a failure does occur in one fault zone that breaks the first route, the same failure cannot also break the second route which goes through different fault zones. U.S. patent application Ser. No. 11/061,236 is hereby incorporated by reference in its entirety into the present application.

The resource manager 125 may consider various factors in provisioning service elements (workloads) on system 100. One such factor is resource availability. The resource manager can use an AFR value to confirm that a resource is reasonably reliable, such that it can be expected to run for a significant time without interruption due to failure. The provision of enhanced AFR data is described in U.S. patent application Ser. No. 11/418,796, filed 5 May 2006 and entitled "METHOD AND APPARATUS FOR DETERMINING A PREDICTED FAILURE RATE", and assigned to the same assignee as the present application, which is hereby incorporated by reference in its entirety into the present application. This document describes a dynamic AFR, whereby the AFR for a resource can be determined based on the latest system configuration and/or life-cycle data for the system.

Another factor for the resource manager to consider is redundancy. Thus resource manager 125 can assign active or passive standby/backup roles to different independent (i.e. in terms of single point of failure) nodes components. For example, in computer system 100, nodes 101A and 101B may represent primary processing nodes, while node 101C may represent a secondary processing node. This allows workload processing to proceed on the secondary node or resource if the primary resource becomes unavailable. One mechanism for providing and handling such redundancy is described in the above-referenced U.S. patent application Ser. No. 11/061, 236.

A further factor for the resource manager 125 to consider is where a diagnosis engine or system 160 uses error reports from the computer system to determine that a resource may be entering some kind of suspect or pathological condition. If the diagnosis engine determines that there is a significant probability that some kind of failure will occur, it notifies the resource manager, which can then re-provision the workload accordingly. The provision and handling by the resource manager of such a notification of a suspect resource is described in U.S. patent application Ser. No. 11/477,241, entitled "METHOD AND APPARATUS FOR PERFORMING A SERVICE OPERATION ON A COMPUTER SYSTEM", filed 28 Jun. 2006 and assigned to the same assignee as the present application, which is hereby incorporated by reference in its entirety into the present application.

The same patent application also describes a mechanism whereby a requested service operation can be accompanied by a prediction of the expected outage duration for the relevant resource(s). This information can be useful for the resource manager in helping to schedule the service operation itself, and also to provision workload before, during and after the requested service operation.

The expected time to repair (including possible replacement) of a failed resource or component is important not just in the context of a requested service operation. Thus at any point in time, there is a finite set of resources available for the system. Consequently, it is not possible to repeatedly re-provision workload elements to new resources whenever a resource fails or has an increase in failure probability. In such circumstances, the expected repair time is important, since it defines the estimated time the system may need to operate in a degraded mode—i.e. with a reduced set of usable resources.

However, the resource manager does not need to know the implementation details of a particular repair action. For example, it does not matter to the resource manager if the repair action is a simple reset; if a replacement component must be ordered, shipped, and then replaced on-site; or if a cold spare is already available and can be powered up at short notice. From the perspective of the resource manager, the significant factor in these different situations is the wide range of expected repair times associated with these three examples of different possible repair actions.

In project management it is known to produce a "risk/impact" diagram in which each identified "risk situation" (i.e. a named situation/condition that would negatively impact the project) is listed. For each risk situation (or simply each "risk"), two numbers are specified:

a probability factor that reflects the likelihood that the relevant risk situation will occur, and an impact factor, which reflects the consequences of the risk situation happening (a higher impact factor indicates that the consequences are more severe).

An overall risk weight is then defined as the product of the probability factor and the impact factor. Assuming that a risk diagram for a project has been filled in with all the relevant risks, and that reasonable values have been assigned to the probability and impact factors for each risk, the risk diagram identifies those risks with the highest weights. These are generally the risks that need most attention, whether in the form of additional resources, a mitigation or backup strategy, etc.

In accordance with one embodiment of the invention, a risk weight is developed as a per resource attribute. In particular, a list of risks is defined for each resource, and a corresponding "impact" is determined for each risk based on the expected repair time (in number of seconds or any other suitable metric). The probability factor for each risk is represented as the combination of a percentage number and a lead time (in seconds). Overall, each identified risk is provided with a probability percentage, a lead time, and an expected repair time. This triplet of parameters is interpreted as indicating that "there is a <percentage number> percent probability that the identified resource failure condition will occur within <lead time> seconds, and if so, it will take <expected repair time> seconds before the resource can be expected to be available/operational again".

Note that the probability factor is related to the AFR in that both measure the likelihood of failure. For example, an AFR of 0.5 implies that there is a 50% chance of a failure within one year (so that the percentage number=50 and the lead time=31536000 seconds). Note that an increase in AFR value corresponds to an increase in the percentage number and/or a decrease in the lead time for the probability factor.

In one embodiment the system uses a predictive analysis from the diagnosis information to produce a more refined probability factor—i.e. one specific to the resource in question, rather than being based on some average value. For example, if the diagnosis engine 160 observes an increase in (correctable) errors from a memory unit, it may suspect that a particular fault is developing. Accordingly, the diagnosis engine may predict an increased likelihood for failure of that unit (above the standard AFR rate for the unit).

It will be appreciated that a given resource is likely to be subject to multiple different risks, each having its own probability factor. However, all risks associated with a given FRU will generally have the same expected repair time, given that the same repair operation is to be performed for all such risks (i.e. replace the relevant FRU). For example, a node (resource) may comprise multiple CPU blades running a specific system image version. Each blade generally has an estimated AFR value. In addition, a probability factor may also be provided for the resource using a risk assessment based on predictive analysis (e.g. the occurrence of memory or bus bit errors may be taken as an indicator of increased likelihood of failure). The associated expected repair time may reflect obtaining a replacement blade from a site local depot followed by standard FRU replacement procedure.

Orthogonally to this, the resource may have an associated system image which has a different AFR from the blade. The AFR may be based on experience data for the relevant OS version and usage type. This AFR value may be used to provide the probability factor for the system image. Alternatively, a probability factor may be available from predictive analysis for this system image (SI)—for example, the operating system might be aware that memory leakage is causing the SI to run out of available resources. The expected repair time in this case for the resource reflects the time it takes to perform a reboot—i.e. significantly less than the time it takes to replace the blade.

The above examples of risks can be viewed as originating from the inherent properties of the resource; hence an AFR value or similar is likely to be available for such risks. Conversely, other risks may be external to the resource. For example, if the ambient temperature of the resource rises, this may lead to failure of a blade. Such a temperature rise may perhaps be due to a fan failure or failure of the air-conditioning system in the room. An AFR value may be available in some of these external situations (e.g. in the case of a fan failure); otherwise an appropriate probability factor (and also repair time) may have to be estimated.

Note that in either case (inherent or external risk), it may be possible to use the current context to provide an updated probability factor using predictive analysis, based on the observed current status and recent history of the resource (rather than using some standard AFR value). In addition, the expected repair time may be updated as appropriate, for example due to service actions. Such service actions may or may not directly affect the system. For example, if a local depot runs out of a particular blade, then this is likely to increase the expected repair time. Another possibility is that a spare blade has already been supplied from the depot and installed as a cold spare in the system. In this case the expected repair time would now be reduced, such as to the reboot time (assuming that the redundant blade acting as a cold spare can be brought on-line via such a reboot).

It will be appreciated that while a given resource may be exposed to multiple risks, the resource manager is generally interested in a single overall (aggregate or accumulated) value for the resource. The resource manager can then use this single aggregate value as the basis for making workload allocations. An algorithm for deriving the accumulated risk for a resource on the basis of the parameters provided for each individual risk impacting that resource for one embodiment is presented in Table 1:

TABLE 1

```
accumulated_risk_weight = 0
for each risk
    if the risk has an associated AFR value
        set afr_factor = AFR
    else
        set afr_factor = 0
    endif
    if the risk has an associated suspicion risk value
        set suspicion_factor = afr_normalized(percentage, leadtime)
        /* the afr_normalized() function translates the specific
         * failure probability + lead time into a standard AFR
         value
         * i.e. normalized to annualized failure rate), so that
         * further arithmetic does not have to distinguish between
         * different kinds of failure probabilities.
         */
    else
        set suspicion_factor = 0
    endif
    risk_weight = afr_factor * repairtime +
            suspicion_factor * repairtime
    accumulated_risk_weight = accumulated_risk_weight +
        risk_weight
endfor
```

Note that the approach of Table 1 takes the standard AFR as the base-line for the risk calculation for any given component. This AFR value may then be supplemented by a suspicion factor (if available), which represents any appropriate increase in AFR due to specific circumstances—e.g. recent errors reports or such. The suspicion factor is defined as mentioned above based on a percentage failure and lead time, but is converted into an AFR format to allow easy combination with the standard AFR value. The risk weight is summed for all the different identified risks for the resource. The higher the value for the accumulated risk weight, the lower the expected availability of the resource.

A resource manager may also characterize the availability of the complete system by computing an "availability ratio" as set out in Table 2:

TABLE 2

```
system accumulated risk weight =
    <the sum of the accumulated risk weight for each resource> /
    number of resources
system availability ratio = 1 / system accumulated risk weight
```

According to this definition, a higher value for the system availability ratio implies higher expected availability. Note that an average risk weight is determined, since the additive nature of the risk weights implies that if a system has many resources, the summation of accumulated risk weight will necessarily be higher (hence the division by the number of resources). If the system includes a certain proportion of redundancy, then the average system accumulated risk weight may provide a more appropriate measure of system reliability. However, if the system depends on the availability of all the resources to operate properly, then the simple accumulated risk weight will generally provide a useful indication of system reliability (rather than using an average).

The approach of Table 2 generally assumes that all the resources are of equal value to the resource manager. However, if this is not the case, the availability ratio calculation can be augmented by taking into consideration a resource value for each of the various resources. For example, the resource value might reflect the capacity of the resource in terms of being able to implement work-load elements (such as processing or storage capability). This would then help the resource manager to allow for both capacity and availability when performing workload provisioning.

If the probability factor (percentage plus lead time) is reduced for a given resource (by reducing the percentage or increasing the lead time), this leads to a decrease in the accumulated risk weight for the resource, thereby improving the availability ratio for the overall system. The accumulated risk weight and the availability ratio can also be improved by reducing the expected repair time. Hence, from an availability perspective, it is possible to make a trade-off in terms of the costs and benefits associated with reducing the probability factor for a resource (e.g. by adding increased redundancy into the resource) and improving the expected repair time for the resource.

In one embodiment, the resource manager uses the accumulated risk weight for the individual resources as a factor when performing provisioning and re-provisioning of workloads. For example, the resource with the lowest accumulated risk weight may be assigned the primary resource role for the highest priority workload, whereas the resource with the highest accumulated risk weight may be assigned a role as secondary resource for the lowest priority workload.

In one embodiment, the resources are grouped into fault zones, as described in the above-mentioned patent application Ser. No. 11/061,236. Resources within the same fault zone share dependency on at least one single point of failure, hence any associated risks from such single points of failure are likewise shared. Thus certain risks can affect more than one resource. For example, a power supply may provide power to a set of resources; if the power supply fails, then all the resources in the set may become inoperative. Hence the risk of a power supply failure is relevant to all the resources in the set. In other words, the power supply represents a single point of failure for the resources in the set, which therefore belong to the same fault zone. In this embodiment, a risk factor may be determined for a fault zone as a whole (using the same approach as determining a risk factor for an individual resource). It will be appreciated that certain risks might be shared even more broadly, across multiple fault zones. However, such risks are generally secondary in nature, since by definition they cannot represent a single point of failure, and can normally be handled separately for each individual resource (as part of the overall accumulated risk for that resource).

The impact of shared risks when computing the availability ratio for a group of resources within a single fault zone is that instead of dividing the average accumulated risk weight by the number of resources within the fault zone, the shared fault-zone is treated in effect as a single resource. Since the number of resources in the calculation of the system accumulated risk weight is therefore lower, the resulting system accumulated risk weight value will be correspondingly higher. Consequently, the system availability ratio value is lower, thereby indicating an increased propensity for failure (thereby reflecting the single point of failure across the fault zone).

In one embodiment, the system availability ratio is only determined in relation to what can be considered as first order events—i.e. a single risk failure. Higher order events involving multiple risk failures are not considered (N.B. a single point of failure that impacts multiple resources in a fault zone is regarded as a single risk failure, not as multiple separate risk failures). The rationale for this approach is that the system availability ratio can be updated after each individual failure occurs to reflect the current situation (the probability of multiple risk failures occurring simultaneously is normally extremely low).

Risks associated with a fault-zone can in principle be handled as additional risks associated with resources in the fault zone, or else such risks can be explicitly associated with the fault-zone as opposed to the individual resources. In either case, the significant factor is the likelihood of a resource becoming unavailable as a result of either the resource itself or the associated fault zone becoming non-operational. Explicitly presenting risks as associated with a fault zone allows a consumer of the risk information to easily track correlated risks. This is particularly useful if/when fault-zone associations change, and allows the consumer to handle such a situation dynamically.

If several resources share the same fault-zone, then a single failure event can render all these resources non-operational without any subsequent warning. On the other hand, if fault zones are not shared (e.g. two redundant operational power supplies serving a set of compute resources), then a single failure event affecting either of the power supplies will not directly impact the operational state of the compute resources. However, such a failure event does provide an early warning, and leads to state change events that cause the compute resources now to share a single fault zone. At this time, the fact that the compute resources are subject to a single point of failure (a newly shared fault-zone) is explicitly reported, and a new risk assessment performed that allows for both resource specific risks as well as for shared risks associated with the new shared fault zone. (Although all the compute resources in the initial state do share a risk associated with the simultaneous failure of both power supplies, this second order risk is in effect discounted as very unlikely, consistent with the general approach taken for the fault zone concept).

Similarly, one can consider the situation where a single cold spare is provided, where this cold spare is shared between multiple resources. Thus as long as the single cold spare is not yet allocated, it reduces the expected service time for all of the multiple resources (which in turn increases the system availability ratio), since any given resource can take advantage of the rapid availability (on-lining) of the cold spare. However, after a first resource has failed and utilised the cold spare, the cold spare is no longer available for use by any of the other resources (or indeed by the first resource, should this suffer a further failure), so that a more elaborate and time-consuming service action would be required (i.e. obtaining and installing a new component). As a result, the system availability ratio is updated accordingly (by repeating the procedure set out in Table 1) to re-determine the relevant risk factors.

Figure 2:
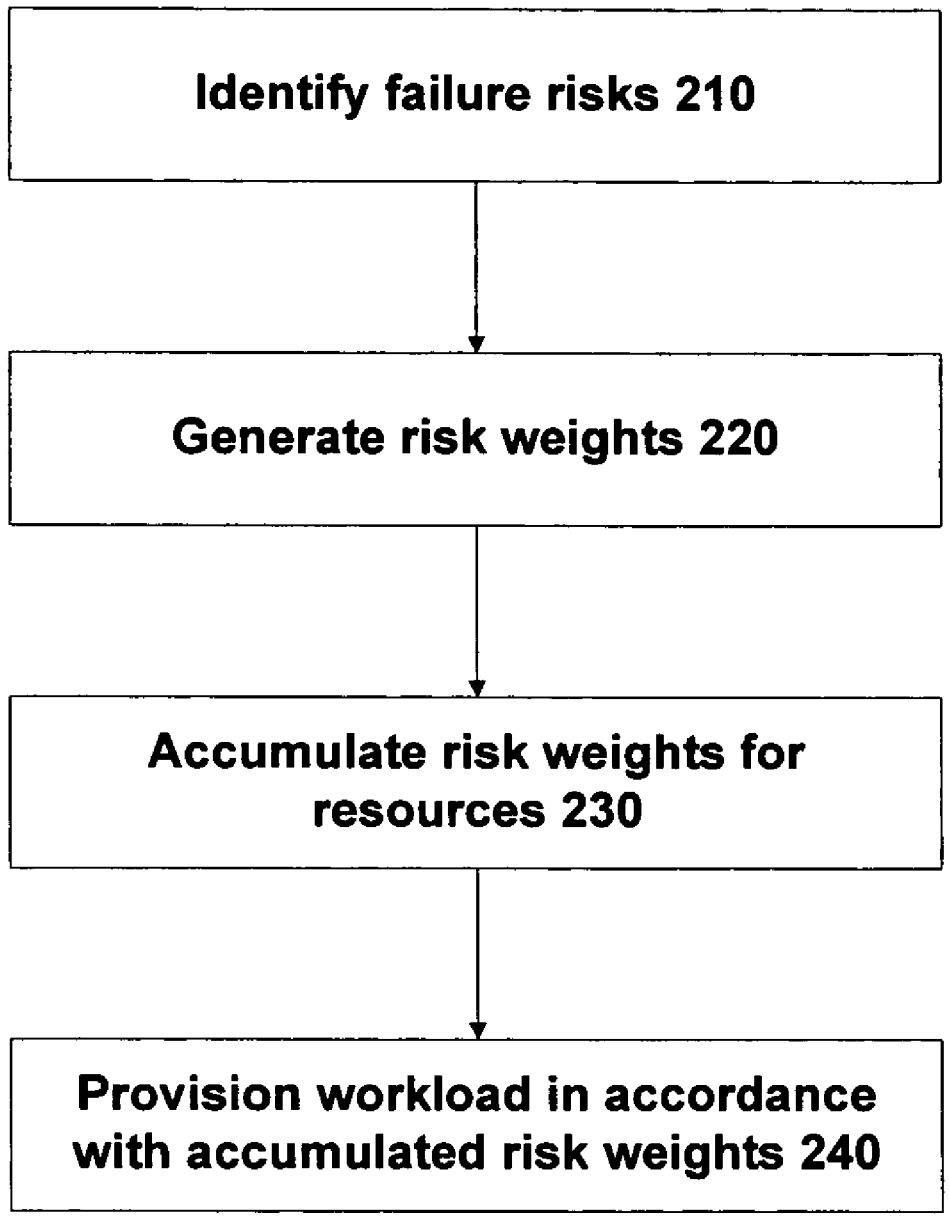
FIG. 2 is a high-level flowchart illustrating a method for managing resources in a computer system in accordance with one embodiment of the invention.

FIG. 2 is a flowchart illustrating a method of managing resources in accordance with one embodiment of the invention. The method commences with identifying the failure risks associated with a resource (210). Note that such failure risks may be originally determined at design time for any given component. The failure risks for the resource then correspond to the failure risks for those components that are identified as being part of (or needed by) the resource according to the current configuration. In some implementations a failure risk may represent complete loss of the relevant resource. In other implementations, a failure risk may also represent partial failure of the resource. For example, in the embodiment of FIG. 1, node 101A may normally comprise three blades, 105A, 105B, and 105C. If blade 105A fails, the node 101A remains operational, but at reduced capacity.

The system now proceeds to generate the risk weights (220), based on the combination of likelihood of risk and expected resolution time for each risk. The information for determining the risk weights may be stored in various places, including FRU ID for the relevant component, the configuration database 135, or at some centralised server accessible over the network 149. In one embodiment, the likelihood of a risk is determined from an AFR value, which may be stored in the FRU ID of the relevant components. The expected resolution time (based on a standard level of service support) may also be stored in a FRU ID, but this stored value may perhaps be superseded if the configuration database indicates that a cold spare is included in the system. The determination of expected resolution time may also involve the system interrogating a parts inventory management system for a warehouse to check local availability.

The system now proceeds to determine the accumulated risk weight for each resource by aggregating the individual risk weights relevant to that resource (230). Note that the generation of the individual risk rates and the subsequent determination of the accumulated risk weight for a resource may be performed by a box manager that is responsible for all the resources in a given box. The accumulated risk weight can then be regarded as an attribute of a resource, which the box manager reports to the resource manager (for example using the BM-FM protocol described in the above-referenced U.S. patent application Ser. No. 11/061,236).

The final step in the flowchart of FIG. 2 is provisioning the workload across the various resources in accordance with the accumulated risk weights (240). For example, a high priority task can be assigned to a resource with a relatively low accumulated risk weight (i.e. good availability), while a low priority task may be assigned to a resource with a higher accumulated risk weight.

It will be appreciated that the accumulated risk weight may be just one factor used by a resource manager in service provisioning. For example, the capacity of the various different resources may also be important for provisioning (a resource must have the capacity to perform the allocated task, irrespective of reliability). Another relevant factor for provisioning may be the nature of the computational task itself. For example, a computational task may generate a lot of stored data during the task. It may be very time-consuming to transfer this stored data to another node (resource) in the event of a resource failure. Therefore, such a task is well-suited to a resource with a low accumulated risk weight, since even if the resource fails, the expected resolution time is comparatively short, thereby allowing the task to resume quickly. (It is assumed that the stored data remains readily available for the task through the failure, since if it took a long time to restore the data from a backup device, this would lead to a higher resolution time).

The processing of FIG. 2 may be performed on a dynamic basis. For example, a change in system configuration may alter the risks associated with any given resource. Furthermore, the expected resolution time may also vary, depending on configuration, part availability, etc. Thus the processing of FIG. 2 may be performed regularly to pick up such changes (or in response to such a change) in order to provide the resource manager with updated information for making provisioning decisions.

Although the approach described herein has generally been presented in the context of computer systems, it is applicable to a very wide range of electronic apparatus. This includes a broad variety of computers, ranging from large-scale servers down to personal computers and beyond, as well as many other electronic systems, such as telecommunications apparatus, subsystems for transport devices such as cars and aeroplanes, and so on. The approach can also be used for monitoring and controlling installations such as power stations, factories, office buildings, and so on.

The software components described herein may comprise program instructions and/or data instructions on some fixed, non-volatile storage, such as a hard disk or flash memory. These instructions and/or data structures can then be loaded for use into random access memory (RAM) for execution and use by a system processor, an application specific integrated circuit (ASIC), or by any other such device. Rather than being stored on a hard disk or other fixed device, part or all of the program instructions and/or data structures may also be stored on a removable storage medium, such as an optical (CD ROM, DVD, etc), magnetic (floppy disk, tape, etc), or semiconductor (removable flash memory) device.

In conclusion, a variety of particular embodiments have been described in detail herein, but it will be appreciated that this is by way of illustration only. The skilled person will be aware of many further potential modifications and adaptations that fall within the scope of the claimed invention and its equivalents.

The invention claimed is:

1. A method for operating a system comprising multiple resources, said method comprising:
   identifying for each resource a set of one or more failure risks for that resource, using a computer system;
   combining for each identified failure risk a likelihood of failure and an expected resolution time to provide a risk weight for the identified failure risk;
   accumulating for each resource the risk weights for each failure risk for that resource to provide an accumulated risk weight for the resource; and
   provisioning workload across the multiple resources based on the accumulated risk weights for each resource, by allocating higher priority tasks to resources with lower accumulated risk weights.

2. The method of claim 1, wherein said likelihood of failure is based on an annualised failure rate (AFR) value.

3. The method of claim 2, wherein said AFR value is supplemented by a predictive analysis based on observed errors or other symptom patterns in the system.

4. The method of claim 1, wherein said expected resolution time comprises the time to perform a reset or restart of the resource.

5. The method of claim 4, wherein said expected resolution time is used to on-line a cold spare.

6. The method of claim 1, wherein said expected resolution time comprises the time to obtain and replace a FRU.

7. The method of claim 1, further comprising updating the accumulated risk weight in response to a change in the expected resolution time for at least one risk failure.

8. The method of claim 1, wherein said identifying, combining and accumulating are performed by a box manager, and said method further comprises transmitting the accumulated risk weights from the box manager to a resource manager, wherein said provisioning is performed by the resource manager.

9. The method of claim 1, wherein the multiple resources are grouped into fault zones such that all resources in a fault zone are subject to a single point of failure, and wherein the method further comprises determining an accumulated risk weight for each fault zone as well as for the individual resources.

10. An apparatus comprising multiple resources, said apparatus comprising:
    a processor;
    a set of one or more identified failure risks for each resource, wherein each identified failure risk has an associated likelihood of failure and expected resolution time;
    logic configured to accumulate for each resource a set of risk weights to provide an accumulated risk weight for the resource, wherein the set of risk weights is determined based on the likelihood of failure and expected resolution time for each identified failure risk; and
    a resource manager for provisioning workload across the multiple resources based on the accumulated risk weight for each resource, by allocating higher priority tasks to resources with lower accumulated risk weights.

11. The apparatus of claim 10, wherein said likelihood of failure is based on an annualised failure rate (AFR) value.

12. The apparatus of claim 11, wherein said AFR value is supplemented by a predictive analysis based on observed errors or other symptom patterns.

13. The apparatus of claim 10, wherein said expected resolution time comprises the time to perform a reset or restart of the resource.

14. The apparatus of claim 13, wherein said expected resolution time is used to on-line a cold spare.

15. The apparatus of claim 10, wherein said expected resolution time comprises the time to obtain and replace a field replaceable unit (FRU).

16. The apparatus of claim 10, wherein said logic is configured to update the accumulated risk weight in response to a change in the expected resolution time for at least one risk failure.

17. The apparatus of claim 10, further comprising a box manager corresponding to one or more resources, wherein said box manager includes the set of one or more identified failure risks for each of said one or more resources and the logic for accumulating a risk weight for each of said one or more resources.

18. The apparatus of claim 17, wherein said box manager is configured to transmit the accumulated risk weights for the one or more resources to the resource manager.

19. The apparatus of claim 10, wherein the multiple resources are grouped into fault zones such that all resources in a fault zone are subject to a single point of failure, and wherein said logic is configured to determine an accumulated risk weight for each fault zone as well as for the individual resources.

20. A computer readable storage medium storing a computer program comprising program instructions, said instructions when loaded onto a system comprising multiple resources causing the system to perform a method comprising:
    identifying for each resource a set of one or more failure risks for that resource;
    combining for each identified failure risk a likelihood of failure and an expected resolution time to provide a risk weight for the identified failure risk;
    accumulating for each resource the risk weights for each failure risk for that resource to provide an accumulated risk weight for the resource; and
    provisioning workload across the multiple resources based on the accumulated risk weights for each resource, by allocating higher priority tasks to resources with lower accumulated risk weights.

* * * * *

UNITED STATES PATENT AND TRADEMARK OFFICE
CERTIFICATE OF CORRECTION

PATENT NO. : 7,669,087 B1  Page 1 of 1
APPLICATION NO. : 11/497022
DATED : February 23, 2010
INVENTOR(S) : Johnsen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 735 days.

Signed and Sealed this

Seventh Day of December, 2010

David J. Kappos
*Director of the United States Patent and Trademark Office*